(12) United States Patent
Garbarsky

(10) Patent No.: US 10,480,124 B2
(45) Date of Patent: Nov. 19, 2019

(54) MACHINING UNIT FOR A MACHINE TOOL AND SUCH A MACHINE TOOL

(71) Applicant: DECKEL MAHO PFRONTEN GMBH, Pfronten (DE)

(72) Inventor: Florian Garbarsky, Betzigau (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 169 days.

(21) Appl. No.: 15/544,184

(22) PCT Filed: Jan. 15, 2016

(86) PCT No.: PCT/EP2016/050769
§ 371 (c)(1),
(2) Date: Jul. 17, 2017

(87) PCT Pub. No.: WO2016/113393
PCT Pub. Date: Jul. 21, 2016

(65) Prior Publication Data
US 2018/0010297 A1    Jan. 11, 2018

(30) Foreign Application Priority Data
Jan. 16, 2015  (DE) .................. 10 2015 200 665

(51) Int. Cl.
*B23Q 1/00* (2006.01)
*H02G 3/04* (2006.01)
(Continued)

(52) U.S. Cl.
CPC ............. *D07B 7/14* (2013.01); *B23Q 1/0009* (2013.01); *B23Q 1/52* (2013.01); *F16G 13/16* (2013.01);
(Continued)

(58) Field of Classification Search
CPC ...... B23Q 1/0027; B23Q 1/5412; B23Q 5/20; B23C 1/12; Y10T 409/307672;
(Continued)

(56) References Cited

U.S. PATENT DOCUMENTS 3,716,986 A *  2/1973  Cork ........................ F16G 13/16
                                                                191/12 C
4,069,741 A *  1/1978  Ewertowski ............ B23C 9/005
                                                                408/237
(Continued)

FOREIGN PATENT DOCUMENTS

DE         4320649 A1 *  1/1995  ........... B23Q 1/0027
DE        19833959 A1 *  2/2000  ............... B23Q 5/20
(Continued)

OTHER PUBLICATIONS

Aug. 29, 2018 Office Action issued in Japnese Patent Application No. 2017-537426.
(Continued)

*Primary Examiner* — Nicole N Ramos
(74) *Attorney, Agent, or Firm* — Oliff PLC

(57) ABSTRACT

A machining unit for use on a machining tool has a head carrier that is attachable to the machine tool and has a head carrier housing, a swivel head that is provided to swivel relative to the head carrier about a swivel head rotation axis and has a swivel head housing, a spindle head that is attached to the swivel head and has a working spindle, and a cable run that extends inside the head carrier housing to the swivel head and has a plurality of members that are arranged in succession along the cable run and are connected movably together. Adjacent members are in this case able to rotate and swivel relative to one another and each member has a (Continued)

central piece and a sheathing spaced apart therefrom. The central piece is connected to the sheathing via one or more connection elements.

19 Claims, 7 Drawing Sheets

(51) Int. Cl.
    *F16G 13/16*     (2006.01)
    *B23Q 1/52*     (2006.01)
    *D07B 7/14*     (2006.01)
    *H02G 11/00*     (2006.01)

(52) U.S. Cl.
    CPC ......... *H02G 3/0475* (2013.01); *H02G 11/006* (2013.01); *B23Q 2220/006* (2013.01); *H02G 11/00* (2013.01)

(58) Field of Classification Search
    CPC . Y10T 409/308232; Y10T 409/309296; Y10T 409/309352
    See application file for complete search history.

(56) References Cited

U.S. PATENT DOCUMENTS

| | | | | |
|---|---|---|---|---|
| 4,652,190 | A | * | 3/1987 | Corsi ............... B08B 15/04 29/DIG. 84 |
| 4,659,279 | A | * | 4/1987 | Akeel ................. B25J 19/0029 248/52 |
| 4,712,972 | A | * | 12/1987 | Nakashima .......... B25J 19/0029 174/69 |
| 4,793,203 | A | * | 12/1988 | Staggl ..................... B25J 9/08 174/110 F |
| 5,391,026 | A | * | 2/1995 | Wu ......................... B23Q 1/54 409/201 |
| 5,813,283 | A | * | 9/1998 | Chen ....................... B23Q 1/54 409/201 |
| 5,961,156 | A | * | 10/1999 | Furuhashi ............ B23Q 1/0009 285/154.1 |
| 6,944,923 | B2 | | 9/2005 | Geissler et al. |
| 7,439,446 | B2 | | 10/2008 | Blase et al. |
| 7,584,597 | B2 | | 9/2009 | Blase et al. |
| 7,857,558 | B2 | | 12/2010 | Schrott |
| 8,262,326 | B2 | | 9/2012 | Lechleiter et al. |
| 9,435,464 | B2 | | 9/2016 | Steeger |
| 9,505,060 | B2 | | 11/2016 | Jung |
| 2004/0134050 | A1 | | 7/2004 | Geissler |
| 2006/0260833 | A1 | | 11/2006 | Blase et al. |
| 2008/0078075 | A1 | | 4/2008 | Schrott |
| 2009/0025361 | A1 | | 1/2009 | Blase et al. |
| 2009/0162160 | A1 | | 6/2009 | Lechleiter et al. |
| 2010/0266358 | A1 | * | 10/2010 | Hiramoto ........... B23Q 11/0046 409/137 |
| 2010/0322734 | A1 | * | 12/2010 | Tatsuda ............... B23Q 1/0009 409/231 |
| 2011/0058913 | A1 | * | 3/2011 | Brieden ................ B23Q 5/045 409/211 |
| 2013/0199653 | A1 | * | 8/2013 | Riedel ..................... F16L 3/01 138/106 |
| 2014/0300065 | A1 | * | 10/2014 | Jung ................... B23Q 1/0027 279/142 |
| 2016/0040803 | A1 | | 2/2016 | Steeger |

FOREIGN PATENT DOCUMENTS

| | | | | |
|---|---|---|---|---|
| DE | 203 05 487 U1 | | 6/2003 | |
| DE | 203 05 679 U1 | | 6/2003 | |
| DE | 203 05 677 U1 | | 7/2003 | |
| DE | 102 51 257 A1 | | 5/2004 | |
| DE | 20 2007 017 251 U1 | | 2/2008 | |
| DE | 10 2006 039 202 A1 | | 3/2008 | |
| DE | 10 2010 032920 A1 | | 2/2012 | |
| DE | 20 2011 108153 U1 | | 2/2012 | |
| DE | 20 2012 001 760 U1 | | 5/2012 | |
| DE | 20 2013 101 460 U1 | | 4/2013 | |
| DE | 20 2013 101 992 U1 | | 6/2013 | |
| EP | 0875695 B1 | | 11/2002 | |
| EP | 1405691 A1 | * | 4/2004 | ........... B23Q 1/5412 |
| EP | 2624390 A2 | * | 8/2013 | ............... F16L 3/01 |
| JP | S62188892 A | | 8/1987 | |
| JP | 07001206 A | * | 1/1995 | |
| JP | H10-299839 A | | 11/1998 | |
| JP | 2004-167679 A | | 6/2004 | |
| JP | 2009-142981 A | | 7/2009 | |
| JP | 2009262274 A | * | 11/2009 | |
| WO | WO-9215416 A1 | * | 9/1992 | ........... B23Q 1/0027 |

OTHER PUBLICATIONS

Apr. 20, 2016 Written Opinion issued in international Patent Application No. PCT/EP2016/050769.
Jan. 16, 2015 Office Action Issued in German Patent Application No. PCT/2016/050769.
Apr. 20, 2016 International Search Report issued in international Patent Application No. PCT/EP2016/050769.

\* cited by examiner

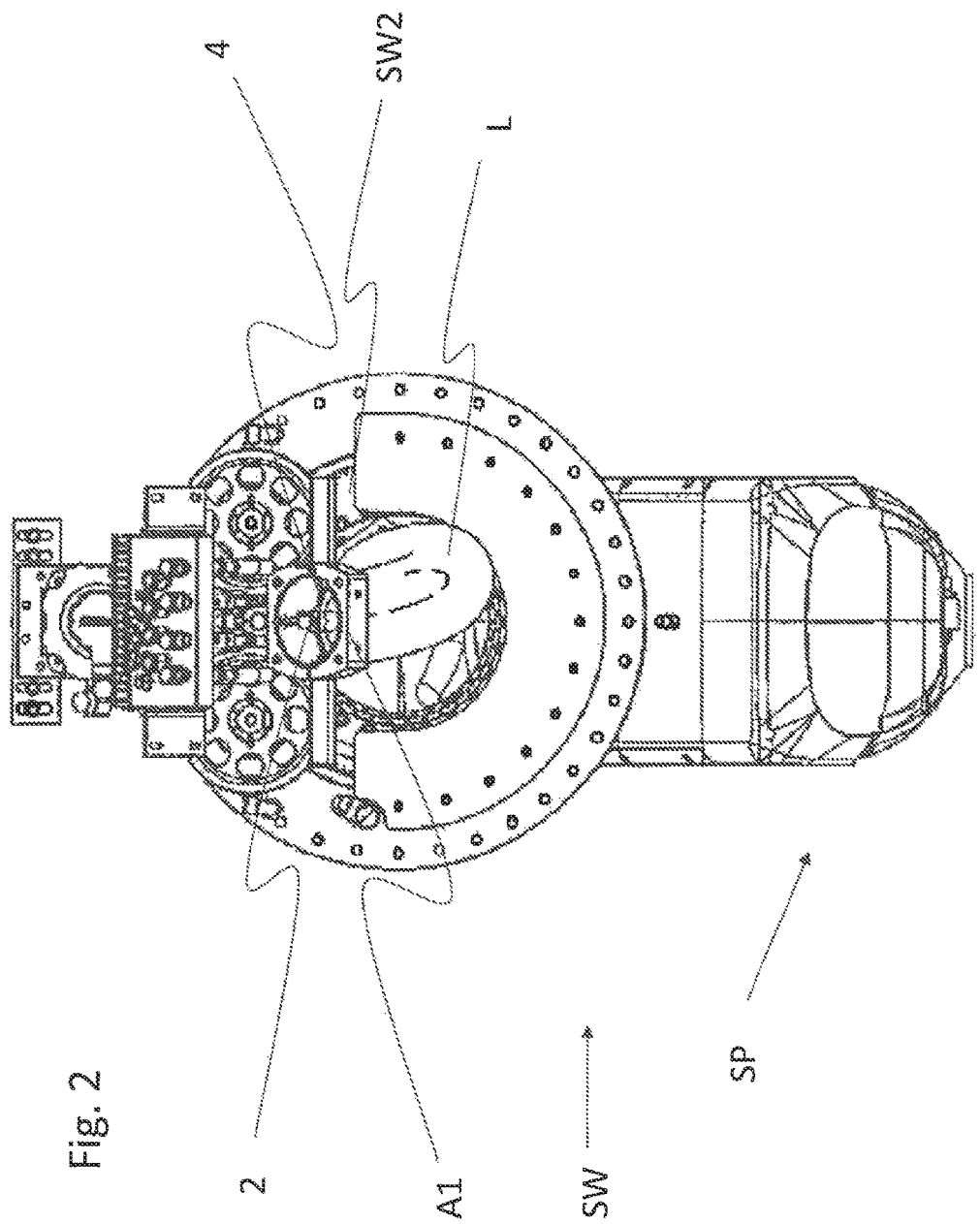

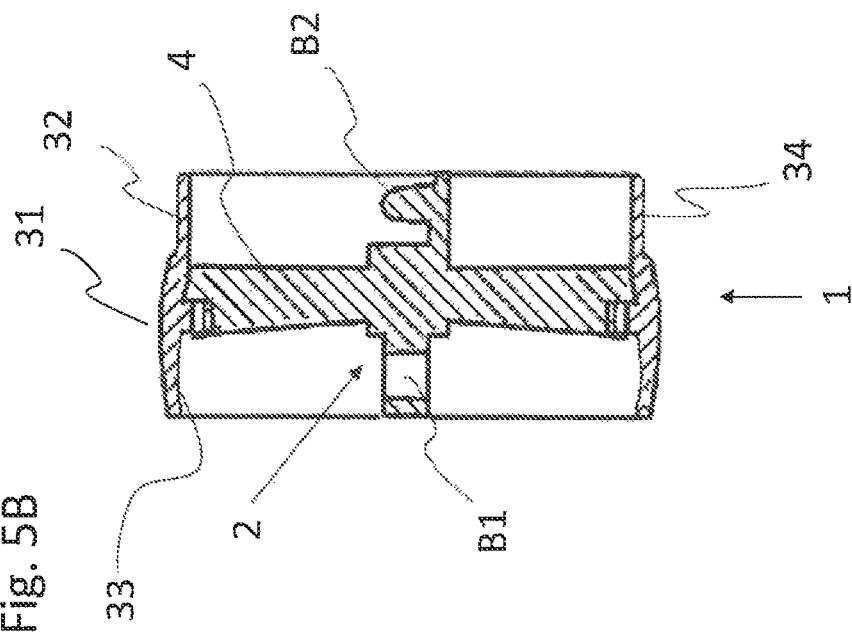
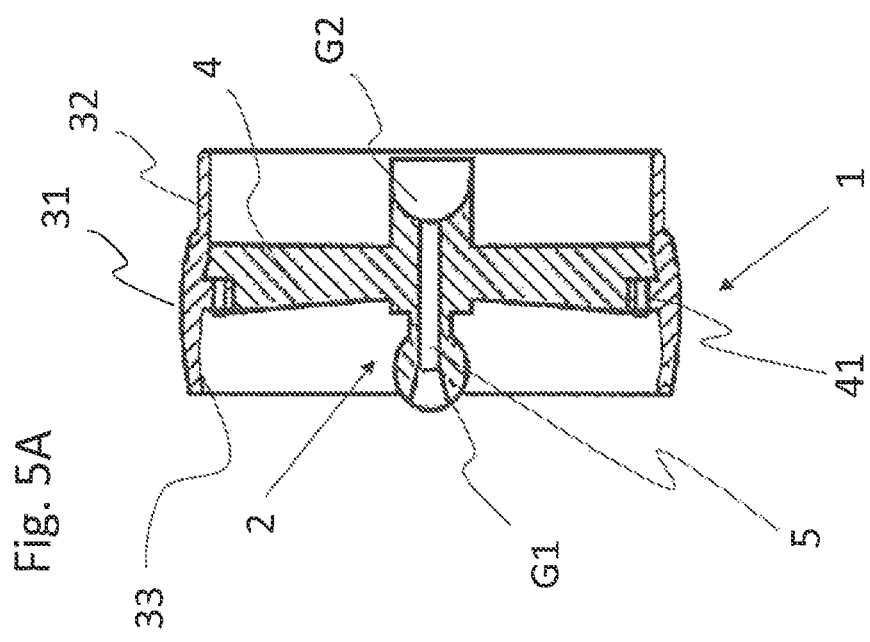

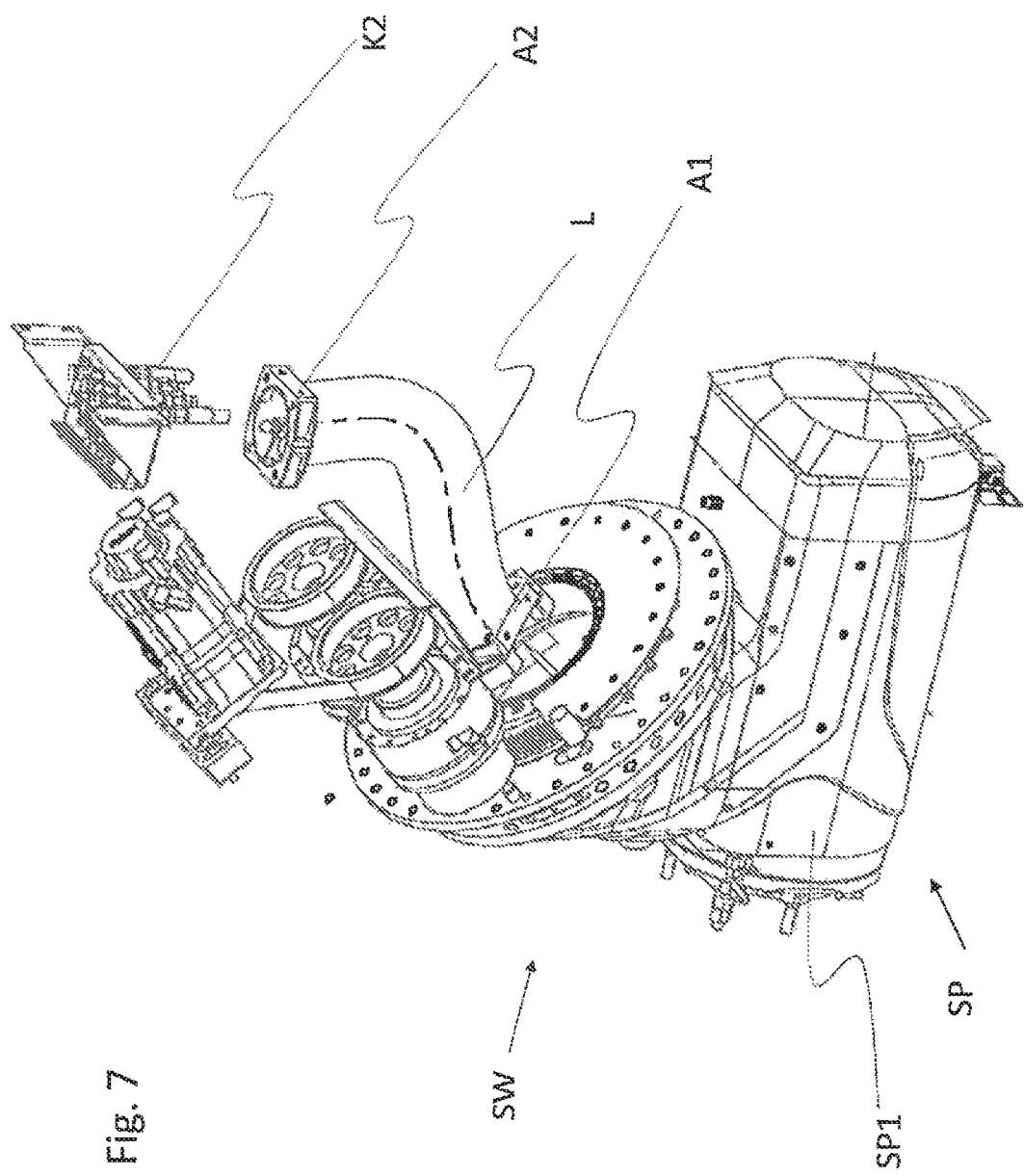

MACHINING UNIT FOR A MACHINE TOOL AND SUCH A MACHINE TOOL

The present invention relates to a machining unit for a machine tool having an advantageous cable run and to a machine tool having such a machining unit.

BACKGROUND OF THE INVENTION

Machining units of the generic type, which are known from the prior art, usually comprise a head carrier that is attachable to the machine tool and a swivel head that is provided at the head carrier in swiveling fashion and has a spindle. The cables required for the swivel head and the spindle, such as energy supply cables or control cables, are here guided from the head carrier to the swivel head via the most diverse cable runs.

DE 100 20 806 A1 discloses a device for guiding cables between two parts of in particular machine tools, said parts being movable relative to one another and said device containing a plurality of support elements for the cables that are hingedly connected to one another. A guiding device which is also suitable to guide cables between parts that are transversely movable relative to one another, is characterized in that each of the two ends of the device is provided with a hinge joint for assembly to the parts movable relative to one another.

DE 102 51257 A1 shows a machining unit for a program-controlled milling and drilling machine having a head carrier which is movable in a plurality of co-ordinate axes and which contains a rotation axis pointing to the front bottom by 45°. A flexible pipe is connected in swiveling fashion to a box-shaped rear part of the spindle head by means of an adapter, the upper end of which is connected to the central part of the head carrier 1 via an elbow fitting that is able to rotate.

An object of the present invention is to develop a machining unit of the generic type in such a way that it has a simplified design structure. A further object is to optimize the cable run between two machining unit parts that are movable relative to one another.

DETAILED DESCRIPTION OF THE INVENTION

In order to achieve the above mentioned object, a machining unit for a machine tool according to claim 1 and/or a machine tool having such a machining unit is proposed. Dependent claims relate to preferred embodiments of the present invention.

The machining unit for use on a machine tool comprises a head carrier which can be attached to the machine tool and comprises a head carrier housing, and a swivel head which is provided to swivel relative to the head carrier about a swivel head rotation axis and has a swivel head housing. A spindle head attached to the swivel head has a working spindle, and a cable run having a plurality of members that are arranged in succession along the cable run and are connected movably together is provided in such a way that it extends inside the head carrier housing to the swivel head. Adjacent members can be rotated and swiveled relative to one another, wherein each member can have a central piece and a sheathing spaced apart therefrom and the central piece can be connected to the sheathing via one or more connection elements. Due to this configuration, a cost-effective and flexible connection of the swivel head and the head carrier is provided. In particular, the cables are connected to the swivel head in such a way that they can be rotated and swiveled. In addition, the arrangement of the cable run inside the housing offers a special protection for the cables, as a result of which the service life thereof can be increased.

The cables are preferably arranged in the cable run and extend along the members in each case between the central piece and the sheathing. Therefore, on the one hand, the cables are protected against external influences and, on the other hand, the cables can easily co-rotate with the swivel head as a result of the central arrangement.

The connecting surfaces of the sheathing of adjacent members are preferably movable relative to one another. Therefore, it is possible to provide a hinge-like hose for receiving the cables.

The central pieces of adjacent members are preferably connected to one another via a hinged connection. The members can here preferably be rotated and/or swiveled relative to one another via the hinged connection. The central connection of the members via the central pieces alone ensures a simple design of the cable run and simultaneously a very high mobility. Since the central pieces can also be arranged inside the sheathing, they are particularly well protected against external influences.

The machining unit preferably has a cable run, which can be attached to the head carrier and the swivel head via respective connection elements, wherein the head carrier and the swivel head can be rotated relative to one another by a rotation angle ranging at least from +180° to −180° and the cable run, attached via the connection elements, can follow the rotary motion of the swivel head due to the movement of the members. It is thus possible to provide an optimum and flexible cable run on the basis of the number of members and the number of degrees of freedom of the connection of the individual members and the relative rotation/swivel angles thereof, wherein said cable run can be rotated/swiveled with the least possible resistance.

It is preferable to arrange at least the connection element on the side of the swivel head in such a way that the cable guide axis of the connection element is arranged parallel to the swivel head rotation axis and in particular in centered fashion on the swivel head rotation axis. Due to this special arrangement, the movement path of the cables is reduced to a minimum when the swivel head is rotated. As a result, the cables and cable runs are burdened to a minimum, which effects an increased service life.

The cable run can comprise at least N members which are hingedly connected to one another, wherein the ends of the cable run can be rotated relative to one another by a rotation angle ranging at least from +180° to −180°. This effects a uniform distribution of the entire rotation angle range to the individual members and/or member pairs, and therefore the load is also distributed uniformly. This favorably increases the service life of the members and of the cable run.

In the case of N members, it is preferably possible to rotate always two connected members by more than 360°/N. Therefore, the members can be rotated over a large angular range relative to one another, which increases the flexibility and durability of the cable run.

The adjacent members of the cable run can be swiveled relative to one another by a swivel angle ranging at least from +10° to −10°. Therefore, the end faces of two adjacent members can be inclined relative to one another by +/− 10° so as to reduce the number of members required for the swiveling cable run. A greater swivel angle is achieved in particular by raising the curvature of the connecting surfaces of the members. In an advantageous embodiment, the swivel angle is up to +/− 30°.

In order to raise the stability and strength, the central piece can be connected to the sheathing via at least three separate rib-like connection elements.

The central piece can have a hinge ball and a hinge socket for connection with adjacent members so as to easily achieve the rotating and swiveling capacity of the members relative to one another with only one joint.

The central piece can preferably have a channel for receiving a flexible connection element, and the members can be connected via the flexible connection element. The flexible connection element can be e.g. a rope onto which the members are slipped via the channels. Here, it is particularly favorable to use a stable wire rope with metallic wires. It is thus possible to produce a cable run in a simple and flexible way. In addition, the connection hinges of the members are unloaded.

The sheathing can comprise a swiveling segment, wherein the swiveling segment can be able to preferably swivel in a radial direction. The swiveling segment can also be arranged in a detachable fashion on the connection element. Therefore, the cables which are disposed inside the cable run can be inspected or even be exchanged by folding away the segment.

The swiveling segment can preferably be connected to the connection element via a hinge attached in the end region of the connection element. As a result, it is possible to achieve a favorable rigid structure of the member.

The sheathing can preferably sheathe at least part of the cables and the members can overlap in such a way that a region enclosed by the sheathing can be sealed against a region outside the sheathing. This seal can be achieved in particular by sealing lips in the connection region of the sheathing of the adjacent members. Therefore, the protective function of the cable run is optimized, and the cables have optimum protection against e.g. hot chips or oils.

The connection surfaces of the sheathing of adjacent members can at least partly overlap. It is thus possible to provide a closed protected tube which surrounds the cables.

The connection elements can extend from the central piece in a radial direction to the sheathing. As a result, the strength of the sheathing is increased.

A machine tool can preferably have a machining unit including at least one of the preceding features.

BRIEF DESCRIPTION OF THE DRAWINGS

FIG. 2 shows a top view of the swivel head FIG. 5A shows a sectional view of an embodiment of a cable run member FIG. 5B shows a sectional view of a further embodiment of a cable run member FIG. 7 shows a side view of the swivel head

DETAILED DESCRIPTION OF PREFERRED EMBODIMENTS OF THE PRESENT INVENTION

Embodiments of the present invention are described in detail below by means of the exemplary drawings. The features of the embodiments can be combined in whole or in part, and the present invention is not limited to the described embodiments.

Figure 1:
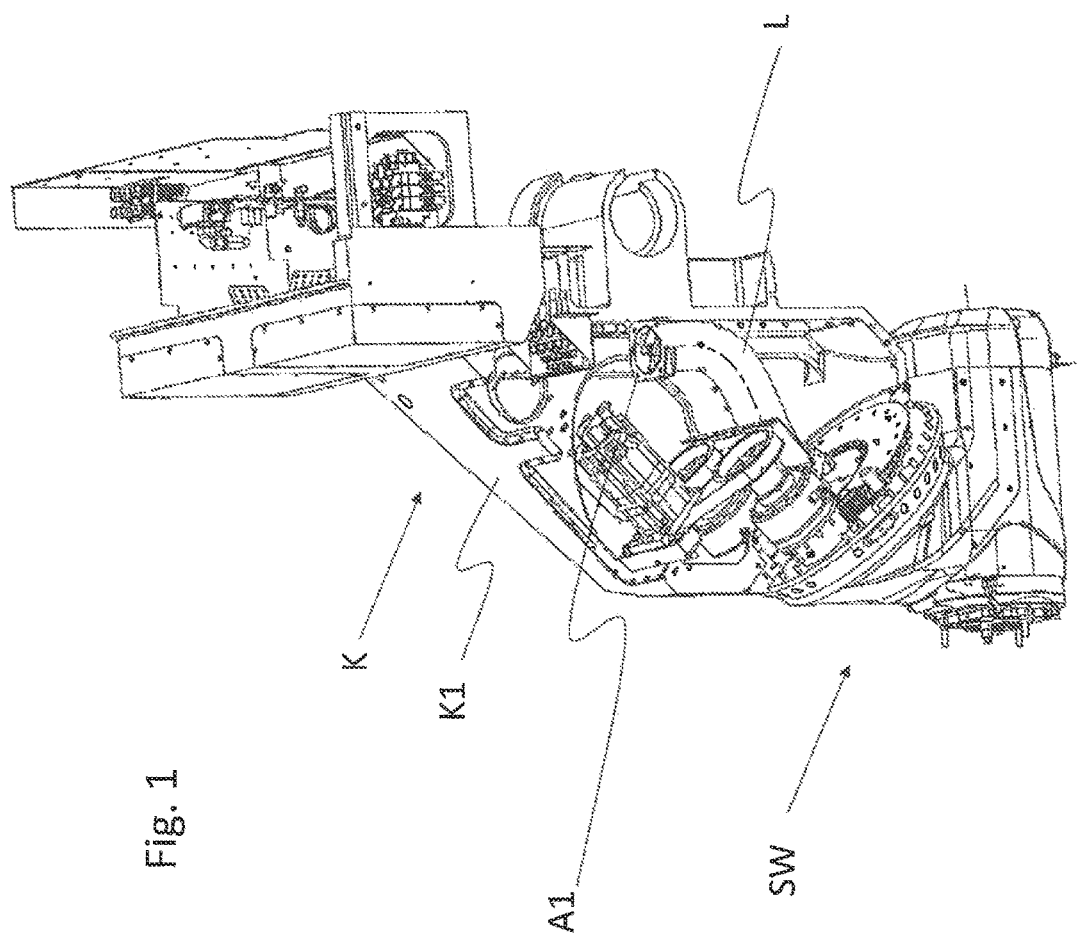
FIG. 1 shows a first view of the processing machine according to the invention

FIG. 1 shows the machining unit of the present invention. The machining unit comprises a head carrier K and a swivel head SW which is connected thereto and has a swivel head housing SW1. The swivel head SW is here configured in such a way that it can be rotated about a swivel axis relative to the head carrier K. The head carrier K of the machining unit is provided e.g. along two axes which lie in a movement plane in such a way that it is adjustable on a front side of the machine tool. The head carrier K also has a head carrier housing K1.

The head carrier K shown in FIG. 1 is arranged at an angle of substantially 45° with respect to the movement plane. The swivel head SW with the spindle head SP is provided on the front side of the head carrier K via a bearing. The swivel head SW is in this case arranged in such a way that it can be rotated about the swivel axis. The spindle head SP fixed to the swivel head SW also co-rotates with the swivel head SW. The swivel head is in this case rotated at a rotation angle range of preferably +/− 180° about a neutral position relative to the head carrier K.

The rotation is effected via sprockets which are driven via an adjusting motor. The driven sprockets mesh with a gear wheel of the swivel head SW (adjusting gear wheel SW2). The rotation of the gear wheel of the swivel head SW thus effects a rotation of the entire swivel head SW and the spindle head SP attached thereto.

The spindle head SP also comprises a motor (or spindle drive) having a drive shaft and a connection region.

Cables are provided between the swivel head SW and the head carrier K and are accommodated in a cable run L. These cables comprise e.g. control cables and drive cables for the spindle head SP for driving and for controlling the spindle SP1. The cable run L is attached to the head carrier K via a connection A1 on the side of the head carrier. The cable run L is here made like a hinge-like tube and protectively encloses the cables. When the swivel head SW is rotated about the swivel axis, the cables and the cable run are correspondingly carried along. Therefore, the cables are co-rotated with each rotation of the swivel head SW and are thus structurally burdened. The cables are favorably arranged in the region of the swivel axis so as to reduce the movement radius in the rotary motion and thus to reduce the structural load of the cables and in particular of the protective cover of the cables and the cable run. This serves in particular to increase the service life of the cables.

FIG. 2 shows a top view of the swivel head SW in the neutral position. The lower region here shows the spindle head SP with the spindle SP. The cable run L is attached to the head carrier via the connection element A1. The cable run consists of cable run members (members 1) which each have a central piece 2 in the center, wherein the central piece is connected to the sheathing of the cable run L via connection elements 4 extended in the radial direction and keeps these parts at a distance. A hinge-like tube is provided as a cable run L by this structure.

FIG. 2 shows the cable run in the center of the region of the swivel axis between head carrier K and swivel head SW, the swivel axis in FIG. 2 being orthogonal to the image plane and coaxial to the rotation axis of the adjusting toothed wheel SW2 of the swivel head SW. In the illustrated embodiment, the connection element A1 has four connecting holes at the connecting flange. The connection element A1 is attached to the connection flange of the head carrier K by connection means, such as bolts or screws, which are provided in the connecting holes.

Figure 3B:
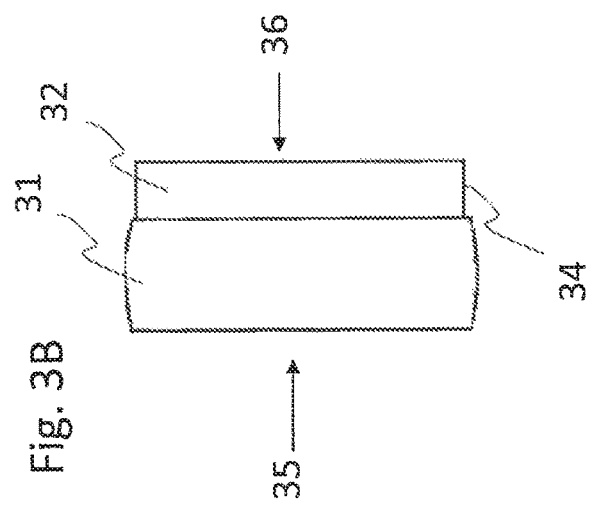
FIG. 3B shows a side view of a cable run member
Figure 3A:
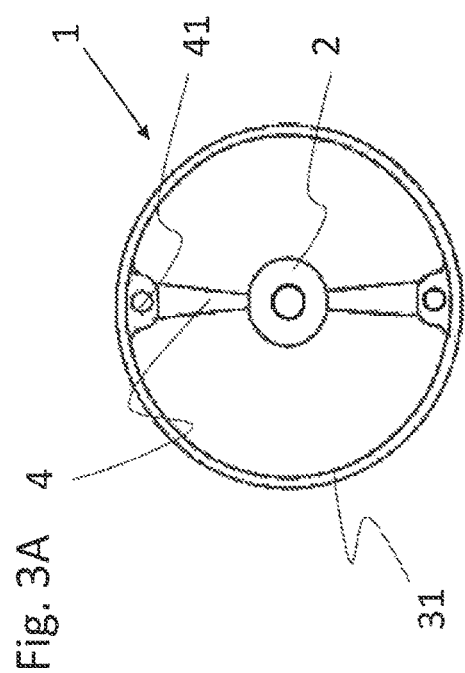
FIG. 3A shows a front view of a cable run member

The cable run L is composed of a plurality of cable run members (members 1), wherein connection elements A1 and A2 are provided at the ends of the cable run L and are flanged to the carrier head K and/or the swivel head SW. FIG. 3A shows a front view of a cable run member 1. The protecting case of the cable run L is here formed by the envelope (or sheathing) 31, 32. In a preferred design, the members have a rotation angle of +/− 10° relative to one another.

The sheathing 31, 32 preferably consists of a polymer material, wherein the outer surface of the sheathing which faces away from the central piece 2 in the radial direction can have a rounding. FIG. 3B shows the member 1 with such a rounding which is made as a bulgy lateral surface of the sheathing 31. The rounding serves in particular to further reinforce the lateral surface of the member 1 and thus to increase the stability.

Figure 3C:
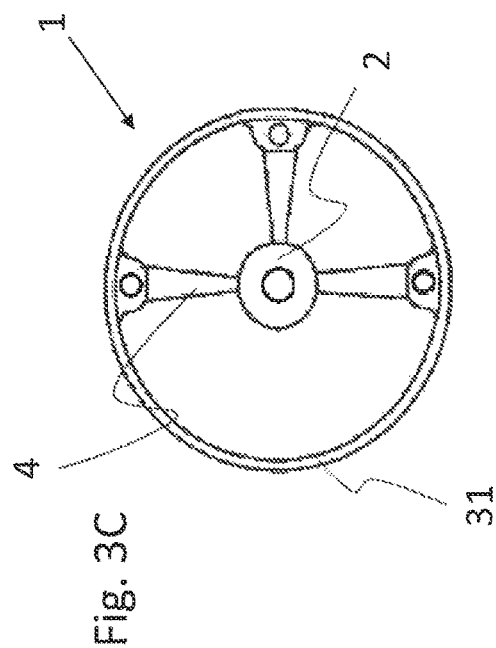
FIG. 3C shows a front view of a further embodiment of a cable run member

The sheathing also has a connection portion 32. The individual members 1 are fitted into one another via this connection portion of the sheathing to form the sheathing of the cable run L. FIG. 3C shows the connection portion of the sheathing. Adjoining members 1 are fitted into one another via the connection portions, wherein the connection surface 34 of the connection portion 32 preferably is lightly curved or wedge-shaped. The rear end of the member 1 of the tapering connection surface is thus inserted into the front end of the adjacent member, such that the respective connection surfaces contact one another. The curved or wedge-shaped configuration of the connection surfaces leads to the possibility that the adjacent members can be swiveled to one another. In particular, adjacent members can be swiveled to one another in such a way that the front side 35 of the adjoining member can be inclined relative to the rear side 36 of the other member by a swivel angle. Therefore, the symmetry lines of the members are inclined relative to one another as a result of the swiveling of the adjacent members. The ends of the cable run L consisting of a plurality of members can thus be swiveled relative to one another by a total swivel angle depending on the sum of the swivel angle of the adjacent members 1. Adjacent members thus form member pairs having a specific swivel angle of in particular +/− 10° and preferably +/− 15°. Depending on the number of member pairs, a swivel movement of the ends of the cable run L by the sum of the swivel angles of the member pairs is possible. Every swiveling connection of two adjoining members 1 should here be regarded as a member pair that can be swiveled. For example, a cable run L, which comprises 10 member pairs that can be swiveled, can carry out a swivel movement of 150°, provided that each member pair has a swivel angle of 15°. Thus, the ends of such a cable run L can be swiveled to one another by 150°. In addition, the torsional angle of a member pair can preferably be +/− 10°.

The sheathing 31 is spaced apart from a central piece 2 via the connection elements 4. The connection elements 4 are provided as rib-like elements which extend from the central piece 2 in a radial direction to the sheathing 31. The connection elements 4 are attached and fixed in mountings of the sheathing via attachment means 41, such as pins or screws. Polymers can also preferably be used as a material of the connection elements. The sheathing can be composed of segments of a circle. In particular, the circular sheathing 31 with associated connection portion 32 can thus be composed of various segments of a circle depending on the respective embodiment. The sheathing is favorably composed of two semi-circular sheathing sections which, when assembled, result in the circular shape of the sheathing 31 as shown in FIG. 3A. The sheathing sections are here fixed to one another in particular via connection portions in the region of the mountings of the sheathing.

A further embodiment of a cable run member 1 is shown in FIG. 3C. In this design, three connection elements 4 are arranged for fixing the sheathing 31. However, the present invention is not limited to this embodiment. The three illustrated connection elements 4 can also be arranged relative to one another at regular intervals of 120°. The advantage is that the structural strength of the member 1 can be increased. In addition, an embodiment is possible that only has a single connection element 4 so as to simplify the structure of the member 1. Depending on the respective load to which the sheathing is exposed, it is also possible to provide four or more connection elements 4, which are preferably arranged relative to one another at regular intervals. The connection elements 4 have a cross-section increasing in the radial direction in order to increase the rigidity and stability of the member 1. This serves to additionally improve the fixation of the connection element 4 to the mounting of the sheathing 31 since the connection region is increased.

Figure 4:
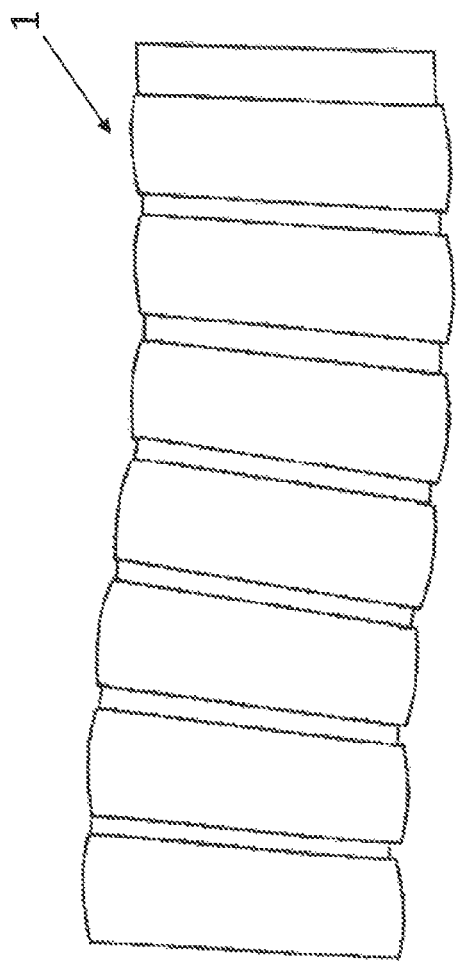
FIG. 4 shows a portion of the cable run

FIG. 4 shows a portion of a cable run L. The members 1 are here fitted into one another. The swivel movement of the individual member pairs renders possible the swivel movement of the cable run L such that the ends of the cable run can be swiveled relative to one another.

The sheathing 31 and the connection portion 32 of the sheathing are connected to the central piece 2 via the connection element 4. In order to connect the lateral surfaces of adjacent members 1, the sheathing 31 is provided with a front connection surface 33 and the connection portion 32 of the sheathing is provided with a rear connection surface 34. FIG. 5A shows a front connection surface 33, which has a concave curvature. This curvature of the front connection surface 33 renders possible the swivel movement of two connected adjacent members. The mounting of the sheathing 32 is used to connect the connection element 4 via attachment means 41 to the sheathing 31. The connection can here be detachable, and therefore the sheathing 31 of the member 1 can be exchanged.

The central piece 2 of the embodiment of member 1 that is shown in FIG. 5A has a hinge head G1 and a hinge socket G2. The hinge head G1 is inserted in the hinge socket G2 of the adjacent member 1 in order to connect two adjacent members 1. This hinged connection of the members 1 thus renders possible a swivel movement and a rotary motion of the adjacent members relative to one another. Thus, the adjacent members can be rotated against one another, and the members 1 can additionally be inclined/swiveled towards one another. Therefore, the front side 35 of the first member can be inclined and/or rotated relative to the rear side 36 of the adjacent second member.

The central piece 2 can additionally have a channel 5, as shown in FIG. 5A, which can accommodate a flexible connection element. In particular, a connection of the members 1 can be effected via a rope which is guided through the channels 5 of adjacent members 1. However, this channel 5 is provided only alternatively and not compulsorily. Depending on the load of the respective machining unit, the strength of the connection of the adjacent members 1 can be increased by providing such a channel 5 and a flexible connection element, and it is thus possible to simultaneously reduce the loads for the connection hinges, such as the hinge head G1 and the hinge socket G2.

The inner region, which is enclosed by the sheathing and is disposed between the central piece 2 and the sheathing 31, 32, accommodates cables of the machining unit.

The central piece 2 and the connection elements 4 can be made as a single piece such that the number of the required components can be reduced, as shown in FIGS. 5A and 5B. Alternatively the connection pieces 4 can, however, be separate from the central piece 2 such that the connection pieces 4 can be detachably connected to the central piece 2 e.g. via plug-in connections. The mountings of the sheathing 31 have bores, into which the attachment means 41 can be inserted. The attachment means 41 here fix the connection means 4 to the sheathing 31. The attachment means 41 are preferably made as cylindrical or conical pins which are inserted into the bores of the mounting of the sheathing and connect the connection element 4 to the sheathing 31 in force-locking fashion. The attachment means 4 can also be available as part of the connection element 4 such that, for the connection to the sheathing 31, the connection elements 4 can easily be fitted into the sheathing in force-locking fashion. This serves in particular to facilitate the assembly of the member 1.

FIG. 5B shows a member 1 having an alternative configuration of the central piece 2. Here, the hinged connection of adjacent members 1 is achieved by bringing together the dowel B2 and the opening B2. The spherical configuration of the dowel B2 and the dome-shaped configuration of the opening B1 render possible a rotary motion and a swivel movement of the adjacent members.

Figure 6:
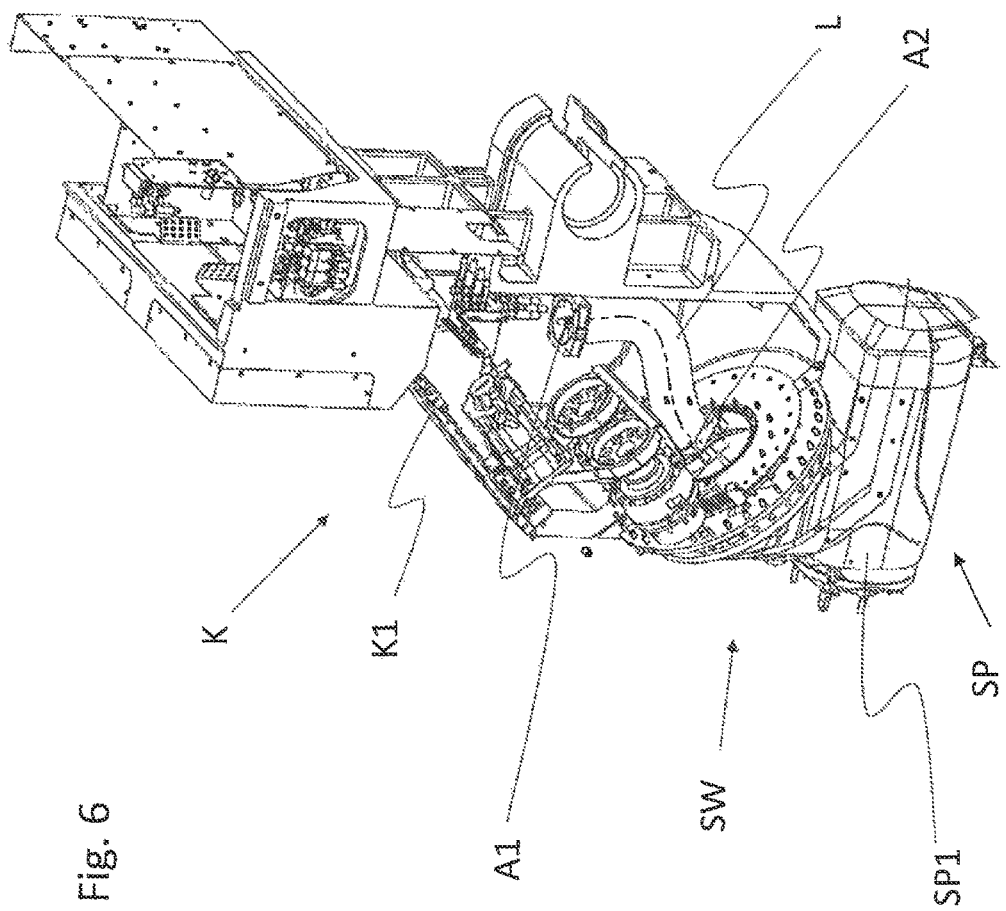
FIG. 6 shows a second view of the processing machine according to the invention

FIG. 6 shows a cable run L in the machining unit. The connection element A2 on the side of the swivel head is here coaxially arranged on the adjusting gear wheel axis of the adjusting gear wheel SW2 of the swivel head. This central arrangement of the connection element A2 on the side of the swivel head ensures that in a rotary motion of the swivel head SW about the swivel axis the cable run L is preferably arranged as closely as possible on the rotation axis so as to be able to minimize the movement range during a rotation, as a result of which the cables are burdened less. The connection element thus rotates about its own axis in the case of a rotary motion of the swivel head. Due to the configuration of the cable run L, described in FIGS. 3A to 5B, the wear of the cables and of the cable run can be reduced even if the connection element A2 on the side of the swivel head is not precisely coaxial to the swivel axis.

As shown in FIG. 6, the cable run is provided inside the head carrier housing K1. Due to such a configuration it is possible to reduce the environmental influences and in particular the influences which result from the machining when the spindle is used. It is thus avoided that e.g. hot chips and oils hit the cable run L during the work process of the machining unit. Therefore, the service life of the cable run can be increased.

FIG. 7 shows the cable connections K2 on the side of the head carrier. The cables are connected to the cable connections K2 on the side of the head carrier and through the cable run up to the connection element A1 on the side of the swivel head.

The invention claimed is:

1. A machining unit for use on a machining tool, the machining unit comprising:
a head carrier that is attachable to the machine tool, the head carrier having a head carrier housing;
a swivel head that is provided to swivel relative to the head carrier about a swivel head rotation axis, the swivel head having a swivel head housing;
a spindle head that is attached to the swivel head, the spindle head having a working spindle; and
a cable run that extends inside the head carrier housing to the swivel head, the cable run including a structure having a plurality of structural members that are arranged in a chain succession, adjacent structural members of the plurality of structural members being movably connected together so as to rotate and swivel relative to one another,
wherein each structural member of the plurality of structural members has a central piece and a sheathing spaced apart from the central piece, the central piece being connected to the sheathing via one or more rib connection elements, which extend from the central piece to the sheathing.

2. The machining unit according to claim 1, wherein one or more cables are arranged in the cable run and respectively run along the plurality of structural members between the central piece and the sheathing.

3. The machining unit according to claim 1, wherein connecting surfaces of the sheathing of each of the adjacent structural members are movable relative to one another.

4. The machining unit according to claim 1, wherein the central pieces of respective adjacent structural members are connected to one another via a hinged connection, the hinged connection is configured to enable the respective adjacent members to be rotated and/or swiveled relative to one another via the hinged connection.

5. The machining unit according to claim 1, wherein the cable run is configured to be attached to the head carrier and the swivel head via one or more respective flanges, the head carrier and the swivel head being configured to be rotatable towards one another by a rotation angle ranging at least from +180° to −180°, the cable run being attached via the one or more flanges follows rotary motion of the swivel head as a result of movement of the structural members.

6. The machining unit according to claim 5, wherein at least one of the one or more flanges is arranged on a side of the swivel head in such a way that an axis of the at least one flanges of the one or more flanges is arranged parallel to the swivel head rotation axis.

7. The machining unit according to claim 1, wherein the cable run includes at least N structural members which are hingedly connected to one another, ends of the cable run are configured to be rotatable towards one another by a rotation angle ranging at least from +180° to −180°.

8. The machining unit according to claim 7, wherein in the case of N structural members, two connected structural members are configured to be rotated by more than 360°/N.

9. The machining unit according to claim 1, wherein the adjacent structural members of the cable run are respectively configured to be swiveled towards each other by a swivel angle ranging at least from +10° to −10°.

10. The machining unit according to claim 1, wherein the central piece of each structural member of the plurality of structural members is connected to the sheathing via at least three separate rib connection elements.

11. The machining unit according to claim 1, wherein the central piece of each structural member of the plurality of structural members has a hinge ball and a hinge socket for the connection to the respective adjacent structural members.

12. The machining unit according to claim 1, wherein the central piece of each structural member of the plurality of structural members has a channel configured to receive a flexible cable and so as to connect respective central pieces of the adjacent structural members via the flexible cable.

13. The machining unit according to claim 1, wherein the sheathing of each structural member of the plurality of structural members includes a swiveling segment, the swiveling segment being configured to be swiveled in a radial direction.

14. The machining unit according to claim 13, wherein the swiveling segment is detachably arranged on one of the one or more connection elements.

15. The machining unit according to claim 13, wherein the swiveling segment is connected to one of the one or more rib connection elements via a hinge attached to an end region of the respective rib connection element.

16. The machining unit according to claim 1, wherein the sheathing of each structural member of the plurality of structural members at least partly encases one or more cables, and the structural members overlap in such a way that a region enclosed by the sheathing, opposite a region outside the sheathing, is configured to be sealed.

17. The machining unit according to claim 1, wherein surfaces of the sheathings of the adjacent structural members overlap at least partly.

18. The machining unit according to claim 1, wherein the one or more rib connection elements extend from the central piece in a radial direction to the sheathing.

19. A machine tool having the machining unit according to claim 1.

* * * * *